Patent 3,639,452

3,639,452
PHENOL PROCESS
Edwin J. Strojny, Midland, Mich., and William D. Gurowitz, Ithaca, N.Y., assignors to The Dow Chemical Company, Midland, Mich.
No Drawing. Filed Mar. 26, 1968, Ser. No. 715,967
Int. Cl. C07c *69/78, 39/04*
U.S. Cl. 260—476 R                                4 Claims

ABSTRACT OF THE DISCLOSURE

Less tar is produced in the copper catalyzed oxidation of benzoic acid to phenyl benzoate when at least ten percent by weight each of benzoic acid and benzoic anhydride is present in the reaction mixture. Preferably, a magnesium compound is also present as a reaction promoter.

BACKGROUND OF THE INVENTION

This invention relates to an improved process for making phenol by the oxidation of benzoic acid. It relates particularly to an improvement in the step of such a process wherein benzoic acid is converted to phenyl benzoate.

The general process whereby phenol is made from toluene as the primary starting material is now well known. Broadly described, this process includes as successive steps the oxidation of toluene to benzoic acid, the oxidation of benzoic acid in the presence of a copper compound to phenyl benzoate, and the hydrolysis of phenyl benzoate to benzoic acid, for recycle to the process, and phenol, the ultimate product. The last two steps can be carried out concurrently in the same reactor or separately, using two reactors or two reaction zones.

A principal disadvantage of this process has been the formation of substantial quantities of tar as the seemingly inevitable by-product of the oxidation step in which benzoic acid is converted to phenyl benzoate. This tarry material, which is thought to be largely polynuclear condensation products of higher molecular weight, not only represents a waste of starting material, but it also forms and accumulates in the reactor in such quantities that it interferes seriously with operation of the process. Tar formation can be reduced to some extent by operating at optimum, carefully controlled conditions. However, it has been necessary to devise various methods for separating tar from the reactor contents periodically or on a continuous basis in order to minimize costly process stoppages. None of these methods has been completely satisfactory.

In this oxidation reaction to produce phenyl benzoate, benzoic acid and benzoic anhydride have previously been thought to be substantial equivalents. It has been found that this is not entirely true.

SUMMARY OF THE INVENTION

According to the present invention, in the process wherein a reaction mixture comprising benzoic acid and a cupric compound at least partially dissolved therein is heated at about 220–320° C. in the presence of molecular oxygen to produce phenyl benzoate which is then distilled at least in part from the reaction mixture, the production of by-product tar is considerably reduced when there is maintained in the reaction mixture a concentration of at least about 10 percent by weight of benzoic anhydride and at the same time, the same minimum concentration of benzoic acid. These concentrations and the volume of the reaction mixture are maintained by periodic or continuous addition to the mixture of benzoic acid and benzoic anhydride in amounts as required. Under these conditions which necessarily entail a substantially anhydrous reaction mixture, the formation of phenol in this step is minimized, the formation of byproducts is largely suppressed, and phenyl benzoate is the only product of consequence.

DETAILED DESCRIPTION

The concentration of copper in the reaction mixture is not critical so long as a significant amount is present to provide a practical rate of reaction. A concentration of 0.3–5 percent by weight as copper is preferred. Any copper compound which is at least partially soluble in the reaction mixture can be used as the source of the copper, for under reaction conditions, any such compound will form cupric benzoate, the active copper component in the reaction.

Preferably, a metal salt promoter is also present in the reaction mixture to facilitate the reaction. The promoter can be any metal compound as taught by Kaeding et al., Re 24,848, and it is preferably a magnesium compound which is at least partially dissolved. A concentration of 1–5 percent by weight of promoter as magnesium metal is preferred. Higher concentrations of both copper and magnesium or other such promoter can be used but offer no advantage.

The process is preferably operated substantially at atmospheric pressure. The process can also be run at moderate subatmospheric or superatmospheric pressure.

The presence of molecular oxygen in the reaction mixture serves to maintain the copper in the cupric state, thereby allowing the reaction to proceed on a continuous basis. Ordinarily, oxygen is supplied by bubbling a stream of air through the reaction mixture. The unused portion of the air then is vented from the top of the reactor and serves to carry phenyl benzoate vapors and other volatile products out of the reactor.

This improved process provides advantages not obtainable with known methods of operation. For example, two-stage reactors have been employed wherein phenyl benzoate is made by heating benzoic acid containing cupric benzoate in the presence of air in one reactor and the phenyl benzoate is hydrolyzed by contacting it with steam in a separate reactor or reaction zone. However, the continuing reoxidation of reduced copper in the first reactor produces water which reacts with the phenyl benzoate to make phenol. The combination of free phenol and cupric copper under reaction conditions is believed to be responsible for most of the tar produced. In the present invention, the benzoic anhydride reacts with the liberated water very rapidly, thereby effectively preventing any significant formation of phenol in this stage of the process.

Preferred operation of the present invention comprises heating at about 240–300° C. a reaction mixture containing 10–90 percent by weight each of benzoic acid and benzoic anhydride with copper and magnesium present as previously described and with a stream of air bubbling through the molten reaction mixture. Desirably, a benzoic acid concentration of 10–25 percent and a benzoic anhydride concentration of 20–60 percent are maintained in the reactor contents and the ratio of benzoic acid plus phenyl benzoate to benzoic anhydride is held to as low a level as possible consistent with the above limitations. In such operation, at least part of the phenyl benzoate and some excess benzoic acid are distilled continuously from the reaction mixture and the phenyl benzoate is hydrolyzed in a second reactor by contact with steam to produce phenol.

EXAMPLE

The reactor was essentially an upright glass pipe of two inch inside diameter and about 30 inches long having electrical heating means, an air inlet, and a sampling valve at the bottom end and a feed inlet at the top. An outlet at the top was connected to a distillation column whereby benzoic anhydride and other less volatile materials were separated from lower boiling products and returned to the reactor.

A mixture of 414 g. of benzoic acid, 585 g. of benzoic anhydride, 18.5 g. of cupric oxide, and 25.3 g. of magnesium oxide was introduced into the reactor and heated to 260° C. Air at 170 liters per hour was bubbled through the reaction mixture at 258–260° C. and a mixture of phenyl benzoate and benzoic acid was distilled from it while the liquid level in the reactor was maintained by continuous addition of a feed mixture consisting of 80 percent by weight benzoic acid and 20 percent benzoic anhydride at an average rate of 1053 g. per hour. Periodic analysis of the reactor contents indicated that after the first two hours of operation, a steady-state condition was approached wherein the benzoic anhydride concentration remained at 14–17 weight percent while the benzoic acid concentration varied between 22 and 42 percent. After twelve hours of operation under these conditions, the green color of the reaction mixture remained essentially unchanged and the mixture contained only 0.02 percent by weight of methanol-insoluble tar. Out of a total input of 86.3 g. moles of benzoic acid and 13.7 g. moles of benzoic anhydride, there was obtained an overall output of 83.3 g. moles of recovered benzoic acid, 2.86 g. moles of recovered benzoic anhydride, 10.2 g. moles of phenyl benzoate, 0.3 g. mole of phenol, and 0.24 g. mole of benzene, representing a material recovery based on moles of benzene rings of 97 percent.

When the above general procedure was repeated using benzoic acid as the sole organic reactant and bubbling air through the liquid reaction mixture at the same rate for 6 hours at 240–260° C. plus 6 hours at 260° C., the final reactor contents was black and contained 21.1 g. of methanol-insoluble tar. The products of reaction were essentially phenol and phenyl benzoate in approximately a 1.7:1 mole ratio. Recovery of aromatic products was 87 mole percent.

Similar experiments wherein benzoic anhydride alone was the organic reactant produced gross amounts of tar amounting to 24 percent by weight of the benzoic anhydride feed. In the same way, experiments wherein the benzoic acid concentration in the reaction mixture was allowed to fall significantly below about 10 percent by weight also produced large amounts of tar and undesirable polynuclear compounds.

We claim:
1. A continuous process for making phenyl benzoate which comprises heating a reaction mixture comprising benzoic acid, benzoic anhydride, and a cupric compound at least partially soluble therein at 220–320° C. in the presence of molecular oxygen and distilling at least some of the phenyl benzoate product from the reaction mixture and substantially maintaining the volume of reaction mixture by adding thereto benzoic acid and benzoic anhydride in amounts sufficient to maintain the concentrations of benzoic acid and benzoic anhydride in the reaction mixture each at at least 10 percent by weight of said mixture.

2. The process of claim 1 wherein the reaction mixture includes a magnesium compound soluble therein.

3. The process of claim 2 wherein the cupric compound and the magnesium compound are each present in sufficient quantity to provide a concentration in the reaction mixture of 0.3–5 percent by weight of copper and 1–5 percent by weight of magnesium.

4. The process of claim 3 wherein the concentrations of benzoic acid and benzoic anhydride in the reaction mixture are maintained at 10–25 percent and 20–60 percent by weight respectively.

References Cited

UNITED STATES PATENTS

| | | | |
|---|---|---|---|
| 3,379,774 | 4/1968 | Forni et al. | 260—621 G |
| 3,349,134 | 10/1967 | Blom et al. | 260—621 G |
| 2,762,838 | 9/1956 | Toland | 260—476 |
| 2,727,926 | 12/1955 | Kaeding et al. | 260—476 |

FOREIGN PATENTS

| | | | |
|---|---|---|---|
| 627,445 | 1/1963 | Belgium | 260—621 G |
| 176,915 | 2/1964 | Russia | 260—621 G |

LORRAINE A. WEINBERGER, Primary Examiner

J. L. DAVISON, Assistant Examiner

U.S. Cl. X.R.

260—621 G